(12) United States Patent
Chivington

(10) Patent No.: US 6,598,500 B1
(45) Date of Patent: Jul. 29, 2003

(54) DOUBLE-NUT TOOL AND METHOD OF SETTING THE TOE ANGLE OF A VEHICLE WHEEL

(75) Inventor: Dean O. Chivington, Marion, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/933,382

(22) Filed: Aug. 20, 2001

(51) Int. Cl.⁷ ............................................... B25B 13/06
(52) U.S. Cl. ...................... 81/55; 81/124.5; 81/124.6; 81/13
(58) Field of Search ............................ 81/124.4–124.7, 81/484, 13, 55, 177.85; 280/86.75, 86.751, 86.754, 86.755, 86.758

(56) References Cited

U.S. PATENT DOCUMENTS

| | | | |
|---|---|---|---|
| 1,389,468 A | * | 8/1921 | White .............................. 81/55 |
| 2,718,806 A | * | 9/1955 | Clark ........................ 81/177.85 |
| 2,772,590 A | * | 12/1956 | Werries ........................... 81/55 |
| 2,790,343 A | * | 4/1957 | White .............................. 81/55 |
| 3,889,558 A | * | 6/1975 | Duncan ........................... 81/55 |
| 3,916,734 A | * | 11/1975 | Sawan ............................ 81/55 |
| 3,983,759 A | | 10/1976 | Linden ........................... 74/88 |
| 4,165,660 A | * | 8/1979 | Behrens ........................... 81/55 |
| 4,328,720 A | | 5/1982 | Shiel .............................. 81/63 |
| 4,424,984 A | | 1/1984 | Shiratori et al. ............. 280/661 |
| 4,517,862 A | | 5/1985 | Garcia .......................... 81/119 |
| 4,577,534 A | * | 3/1986 | Rayne ...................... 280/86.755 |
| 4,616,845 A | | 10/1986 | Pettibone ..................... 280/661 |
| 4,695,073 A | | 9/1987 | Pettibone et al. ........... 280/690 |
| 4,736,964 A | | 4/1988 | Specktor ...................... 280/661 |
| 4,753,454 A | * | 6/1988 | Woehler ................. 280/86.755 |
| RE33,179 E | | 3/1990 | Pettibone ..................... 280/661 |
| 4,973,075 A | | 11/1990 | Rori et al. .................... 280/661 |
| 5,044,659 A | | 9/1991 | Specktor et al. ............. 280/661 |
| 5,098,117 A | | 3/1992 | Specktor et al. ............. 280/661 |
| 5,129,669 A | | 7/1992 | Specktor et al. ............. 280/661 |
| 6,047,789 A | | 4/2000 | Iwanaga ....................... 180/440 |

FOREIGN PATENT DOCUMENTS

| | | |
|---|---|---|
| JP | 63-22068 | 6/1988 |
| JP | 18013 | 3/1995 |
| JP | 2569771 | 4/1998 |

* cited by examiner

*Primary Examiner*—D. S. Meislin
(74) *Attorney, Agent, or Firm*—Alan T. McDonald; Vince Ciamacco; Standley & Gilcrest LLP

(57) ABSTRACT

A device for operating on each nut of a double-nut assembly, wherein an inner nut of the assembly is of a diameter larger than that of an outer nut of the assembly. The device comprises two components: the first component is provided to act on the inner nut and is designed to allow a portion of the second component to pass therethrough, while the second component is provided to act on the outer nut. The first component may be used to rotate the inner nut to a desired position while a portion of the second component resides therein, whereafter the second component may be used to secure the rotated position by tightening the outer nut. The device may be used with an eccentric fastener assembly employing such a double-nut arrangement to set the toe angle of a vehicle wheel.

13 Claims, 7 Drawing Sheets

SECTION 4-4

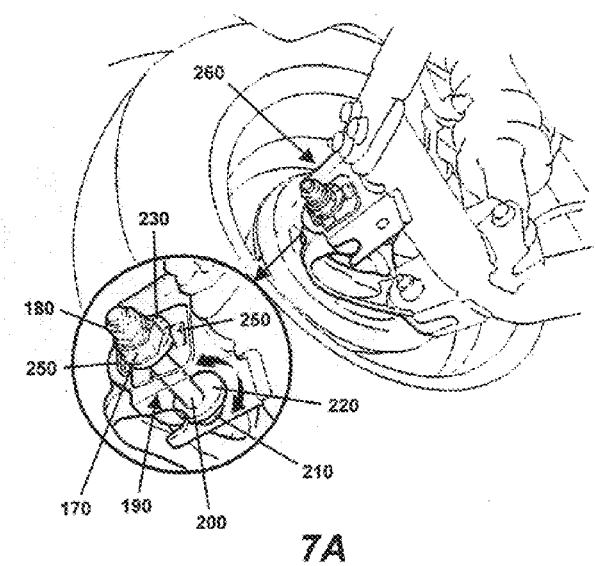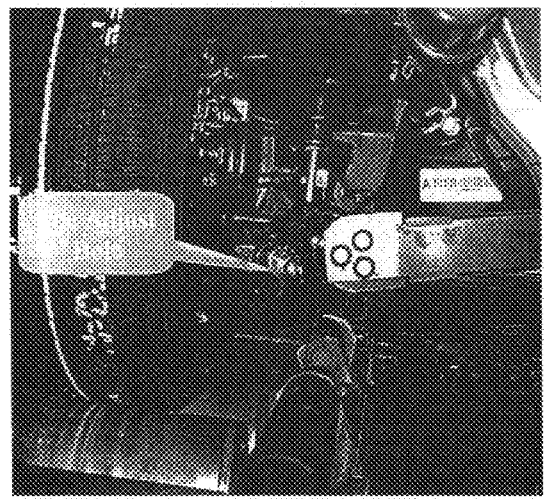
7A    7B

DOUBLE-NUT TOOL AND METHOD OF SETTING THE TOE ANGLE OF A VEHICLE WHEEL

BACKGROUND AND SUMMARY OF THE INVENTION

The present invention relates to a device for manipulating a double-nut arrangement, and a method for setting the toe angle of an automobile wheel using a double-nut arrangement on an eccentric bolt. More specifically, the device is designed for use with a double-nut arrangement, wherein there is an outer nut with a diameter larger than an inner nut. With such an arrangement, the device can be used to adjust the rotational position of the eccentric bolt by turning the inner nut, and to secure the position of the eccentric bolt by maintaining the position of the inner nut while tightening the outer nut.

There are various uses for a double-nut arrangement. Most commonly, a double-nut arrangement is utilized on the threaded portion of a fastener, such as a bolt, to ensure that the secured state of the fastener is maintained. A second nut is generally tightened against a first nut to keep pressure thereon and prevent the first nut from loosening. In this arrangement, each nut is typically of the same relative diameter, although nuts of dissimilar diameter may also be employed.

There may also be the situation, to which the device of the present invention is more particularly directed, wherein the inner nut of a double-nut arrangement is used to adjust the rotational position of the fastener on which it is installed, while the outer nut is used to secure the rotational position of the fastener. Such an arrangement may be utilized in combination with an eccentric fastener element, such as a specialized bolt, so that rotation thereof will accomplish the movement of one or more other elements. This type of double-nut arrangement may be employed in automobile designs, for example, to allow for the adjustment of wheel toe angle.

When used to set wheel toe angle, for example, an assembly comprising an eccentric fastener, such as a bolt, having a head at one end and threads at the other end, an inner nut, and an outer nut may be employed. The inner nut may be adapted to engage a portion of the fastener body near the threaded end. The outer nut may be provided to engage the threaded portion of the fastener, such that the outer nut resides nearer the end of the fastener body than the inner nut. The outer nut preferably also has a diameter that is smaller than that of the inner nut. A disk-shaped flange may be located on both the inner nut and the fastener body, such that when the fastener is rotated, the flanges will rotate along a path eccentric to that of the longitudinal axis of the fastener body. The eccentric movement of the assembly may be used to move an element through which the fastener body passes or, alternatively, to act upon another, adjacent element.

When using such an assembly to set the toe angle of a vehicle wheel, for example, it may be difficult to engage and manipulate both the head of the bolt, to rotate the fastener body and, simultaneously, the outer nut, for securing the rotational position of the fastener assembly. On an automobile, for example, the fastener assembly is typically used on both the driver and passenger sides; resulting in a mirrored orientation from one side to the other. This results in poor ergonomics, both because the bolt head is largely out of sight, and because manipulation of the fastener assembly on one side of the automobile must be performed in a position reversed from that of the other side. Thus, whether the technician is right-handed or left-handed, the technician will be required to work in the opposite manner on one side of the vehicle.

Whatever the application for such a double-nut fastener assembly, it is ergonomically preferable that both adjustment of the fastener's rotational position and tightening of the fastener can be accomplished from the nut-side of the assembly. In this manner, an operator working with the fastener assembly is not required to find and manipulate the head of the fastener body, which may not be visible. Single-sided manipulation also allows the operation to be performed in a more compact space, and in a position more ergonomically friendly to the person performing the operation.

The device of the present invention allows for both the adjusting and tightening of a double-nut fastener assembly from the nut-side thereof. In the present invention, the fastener employs an inner nut that is unthreaded. A portion of the interior of the inner nut is designed to engage flat sections provided on the fastener body. Therefore, rotation of the inner nut will also produce rotation of the fastener assembly. As a result, the proper rotational position of the fastener assembly can be achieved from the nut-side thereof, and searching for the head of the fastener body is rendered unnecessary. The device of the present invention also allows tightening of the outer nut to be accomplished from the nut-side of the fastener assembly, thereby facilitating securing of the fastener assembly position.

The device of the present invention utilizes a multi-component, double-socket arrangement to perform this task. A first component includes a handle, to which one end of a hollow cylindrical portion is attached. To the opposite end of the hollow cylindrical portion is attached an adjusting socket, which is of appropriate size to engage the inner nut. The portion of the handle in communication with the hollow cylindrical portion has an aperture therethrough, that corresponds in relative location to the inner diameter of the hollow cylindrical portion. The aperture permits a portion of a second component of the device to pass therethrough. The second component comprises an elongated and substantially cylindrical shaft, having a drive connector at a first end and a securing socket at a second end. The drive connector is provided for releasably attaching the second component to a torque exerting device, such as a ratcheting or pneumatic wrench. The securing socket is employed to engage the outer nut. A socket coupler is preferably provided at the second end of the shaft, so that the securing socket may be releasably attached thereto after the shaft has been inserted into the first component. The securing socket is sized to allow its movement within the interior of the hollow cylindrical portion and the first socket, but is preferably of too large a diameter to pass through the aperture in the handle portion of the first component. Similarly, the drive connector is also preferably of too large a diameter to pass through the aperture. Thus, the first component is designed to receive a substantial portion of the second component, and to retain the second component therein once the securing socket has been attached to the cylindrical shaft. Additionally, each of the first and second components remain independently movable after insertion of the second component into the first component. In this manner, the first component can be used to adjust the rotational position of the fastener assembly, and to maintain the desired position while the fastener assembly is secured by the second component acting on the outer nut.

BRIEF DESCRIPTION OF THE DRAWINGS

In addition to the novel features and advantages mentioned above, other objects and advantages of the present invention will be readily apparent from the following descriptions of the drawings and exemplary embodiments, wherein like reference numerals across the several views refer to identical or equivalent features, and wherein:

FIGS. 7A and 7B show the double-nut fastener assembly of FIG. 6 as used to adjust the toe angle of a rear wheel of an automobile.

DETAILED DESCRIPTION OF THE EXEMPLARY EMBODIMENT(S)

Figure 1:
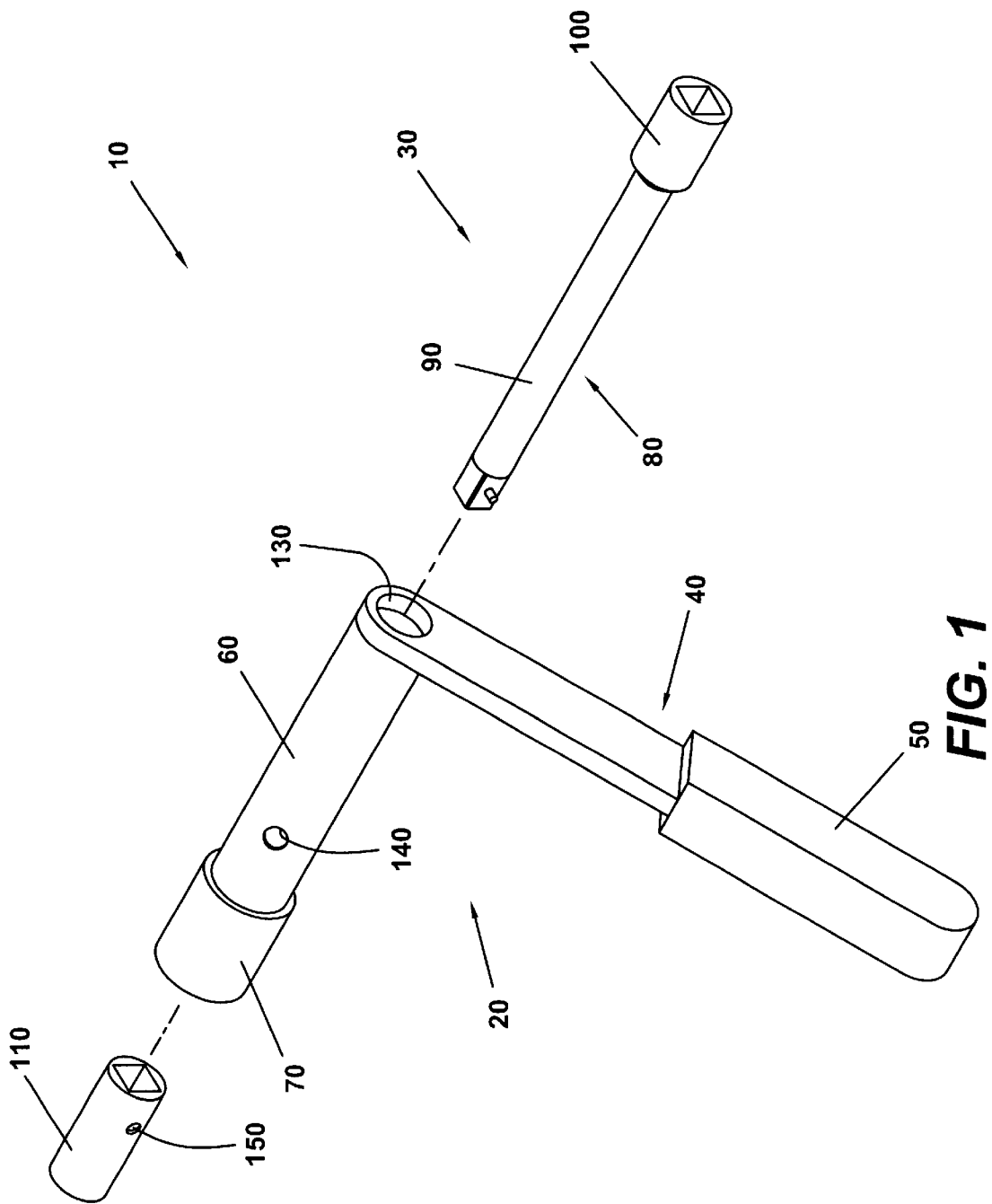
FIG. 1 is an isometric assembly view of an exemplary embodiment of the device of the present invention, wherein a first and second component of the device are shown in an unassembled relationship.
Figure 2:
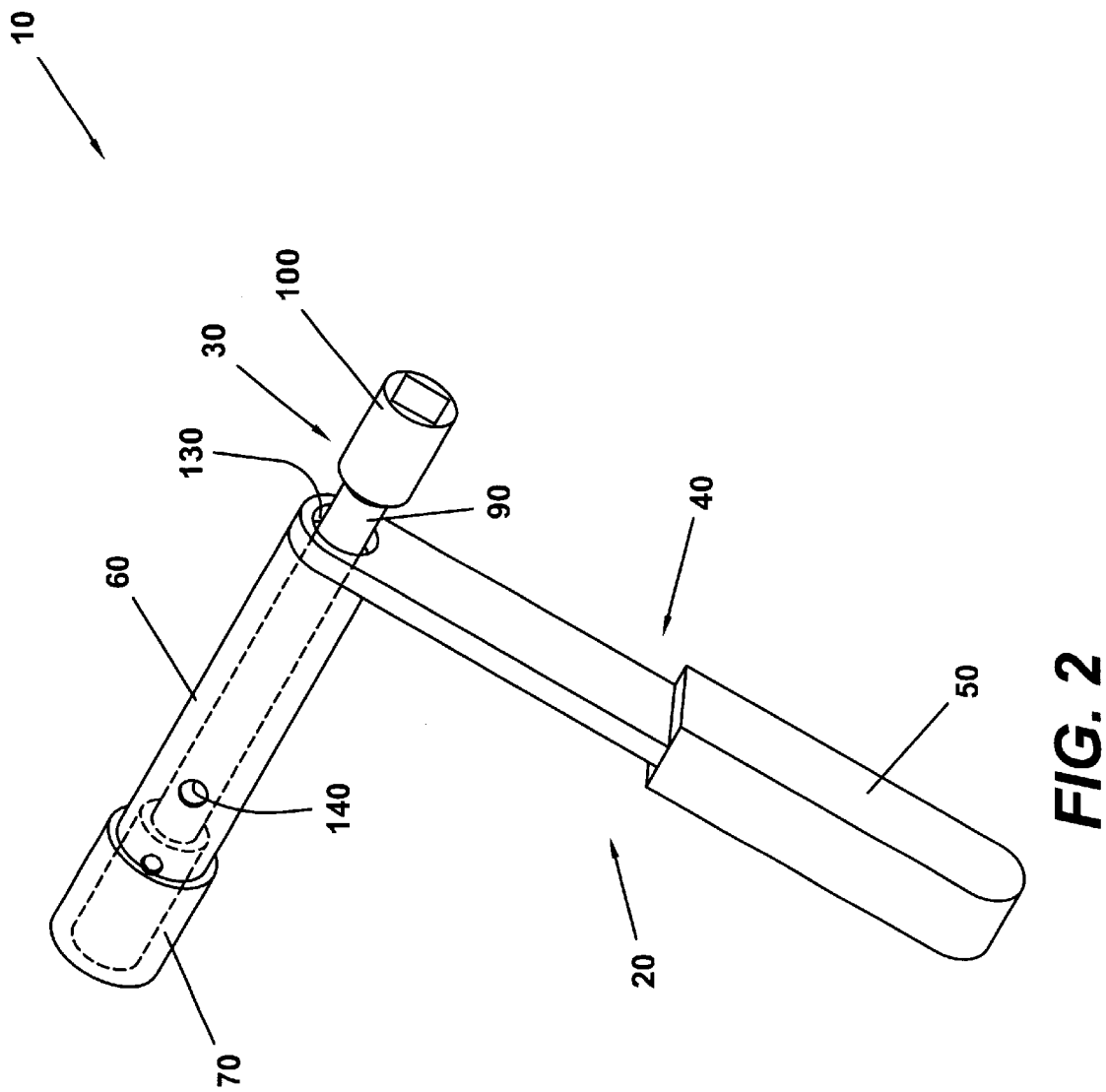
FIG. 2 shows the first and second component of the device of FIG. 1 in an assembled relationship.
Figure 3:
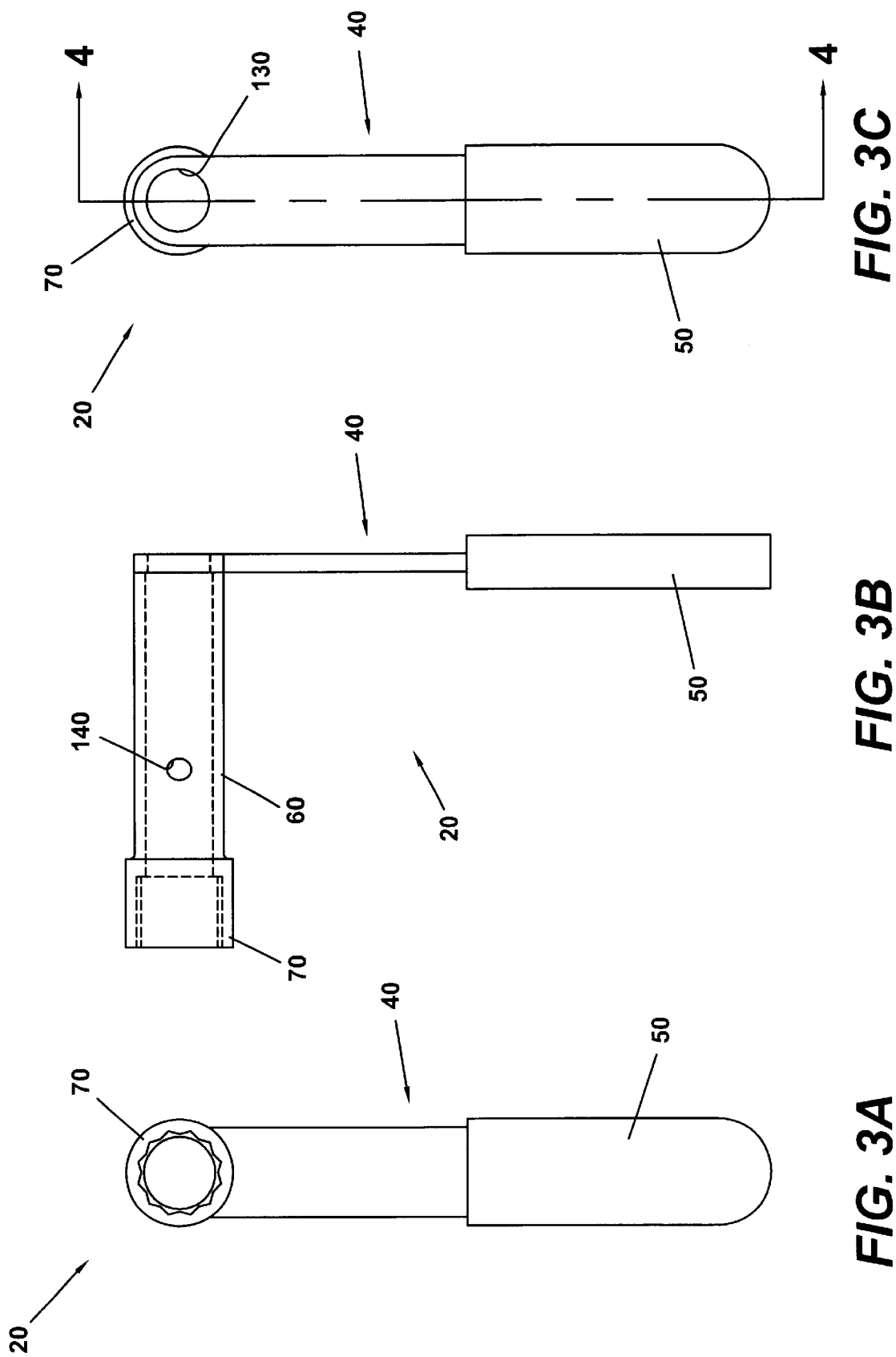
FIG. 3A is a front elevational view of the first component of the device of FIG. 1.
FIG. 3B is a side elevational view of the component of FIG. 3A.
FIG. 3C is a rear elevational view of the component of FIG. 3A.
Figure 4:
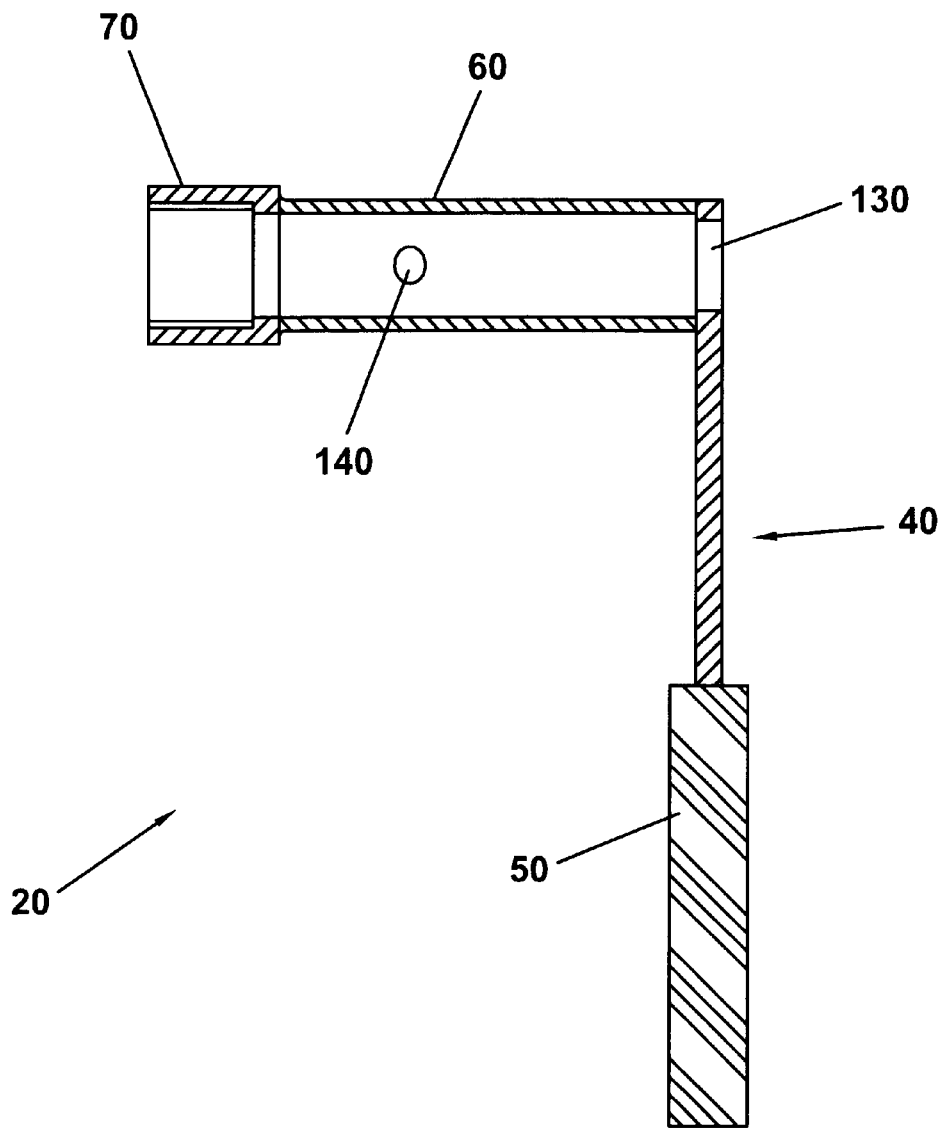
FIG. 4 is a cross-sectional view of the component of FIGS. 3A–3C, viewed in the direction indicated in FIG. 3C.

An isometric view of the double-nut operating device 10 of the present invention can be seen in FIGS. 1 and 2. Referring to FIG. 1, the device 10 is shown to consist of a first component 20 and a second component 30. The first component 20 has a handle portion 40 for allowing the grasping and manipulating of the first component. The handle portion 40 may be partially encapsulated at one end by, or otherwise have attached thereto at one end, a gripping portion 50 for providing increased comfort to a user of the device 10. The gripping portion 50 may be constructed from a plastic, rubber, wood, metal, or other material that helps provide for proper ergonomics. It should be understood, however, that while the gripping portion 50 can provide increased comfort to a user of the device 10, the gripping portion is not essential to the function of the device, nor to the first component 20 to which it belongs.

A hollow, cylindrical receiving section 60 is attached at a first end to the handle portion 40, near the end opposite that to which the gripping portion 50 is affixed. The receiving section 60 serves to house a portion of the second component 30 when the device is in use, and further acts as an extension for connecting the handle portion 40 to an adjusting socket 70. An aperture 130 is provided in the handle portion 40 to allow insertion of a portion of the second component 30 into the receiving section 60. The length of the receiving section 60 permits an operator to use the device without requiring that the operator's hands be in close proximity to the adjusting socket 70. Consequently, the device 10 is better able to function within a work envelope of restricted size.

Figure 5:
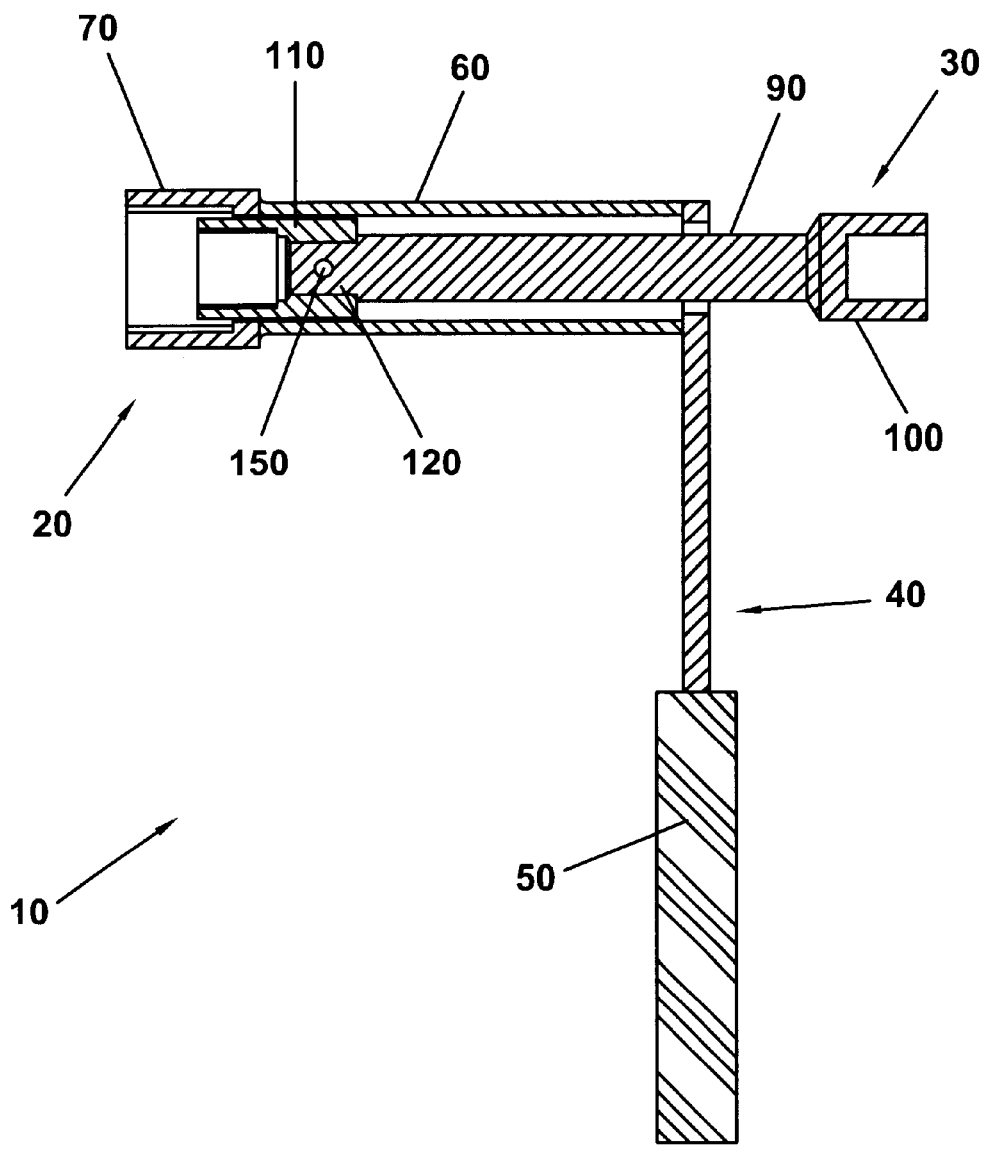
FIG. 5 is the cross-sectional view of FIG. 4, with the second component of FIGS. 1 and 2 also depicted in an assembled relationship with the first component.
Figure 6:
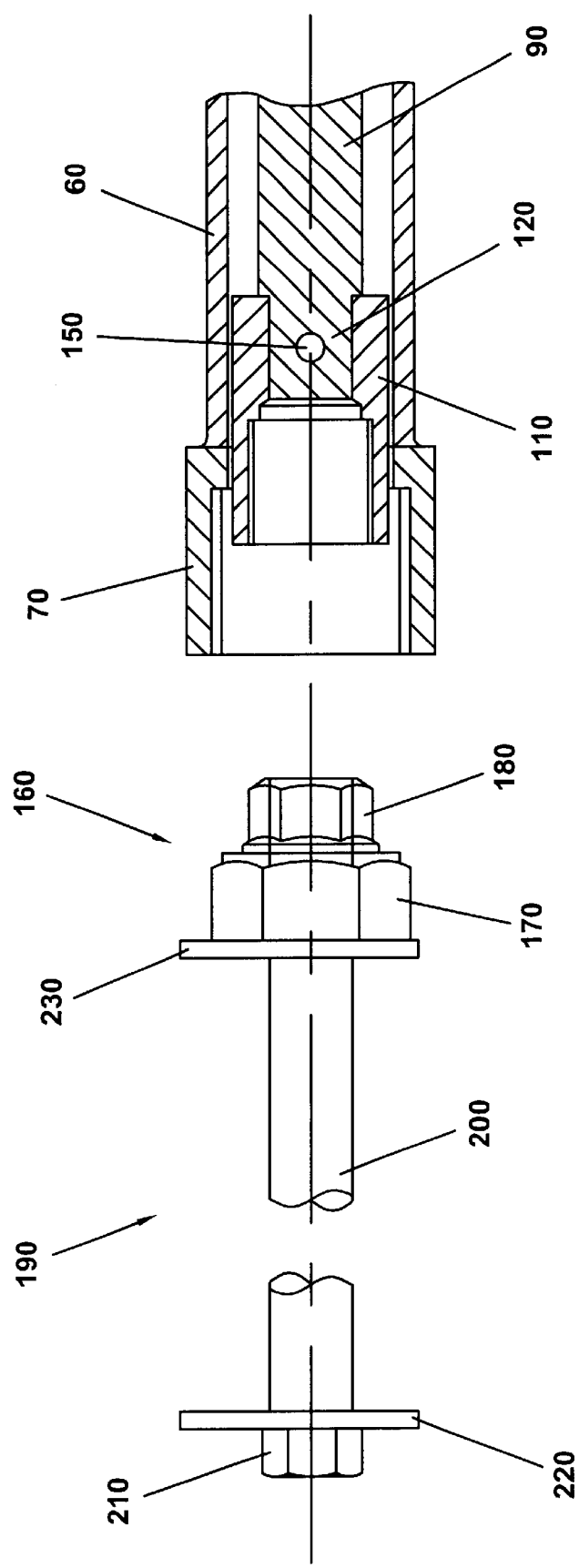
FIG. 6 is an enlarged view of a portion of FIG. 5, depicting how the device of the present invention is employed to operate on a double-nut fastener assembly.

The adjusting socket 70 is attached to the second end of the receiving section 60, and is provided to engage the inner nut 170, of a double-nut arrangement 160 (see FIG. 6). The adjusting socket 70 may be a commercially available socket, such as, for example, a 12-point socket, sized to properly engage the inner nut 170. The adjusting socket 70 may also be custom manufactured to properly engage the particular fastener that is used, whatever its shape may be. In the particular embodiment of the present invention illustrated in FIGS. 1–6, the adjusting socket is shown to be permanently attached to the receiving section 60. When the adjusting socket 70 and receiving section 60 are made from a metallic material, as illustrated in this embodiment, the adjusting socket and receiving section may be joined by welding. Alternatively, the adjusting socket 70 could also be releasably attached to the receiving section 60 by various means, such as by a spring clip passing through slots in the adjusting socket and engaging a corresponding feature in the receiving section, by a spring-loaded ball or pin on the receiving section engaging a detent or recess on the interior of the adjusting socket, or by numerous other means.

The second component 30 is shown to consist substantially of a standard socket extension 80 and a securing socket 110. In this particular embodiment of the present invention, the socket extension 80 comprises an elongated cylindrical body 90, having a drive connector 100 at a first end thereof for releasable attachment to a torque exerting device, and a socket coupling device 120 (see FIGS. 5–6) at a second end thereof for releasable attachment to the securing socket 110. In another embodiment of the present invention (described below), the securing socket 110 may also be permanently affixed to the body 90 of the socket extension 80. The securing socket 110 is provided to engage the outer nut 180, of the double-nut arrangement 160. Like the adjusting socket 70, the securing socket 110 may be a commercially available socket, or may be custom manufactured to properly engage the particular fastener that is used. The torque exerting device may be, for example, a ratcheting wrench, or a pneumatic impact gun.

As can be seen in FIGS. 2 and 5–6, the second component 30 is designed to reside substantially within the first component 20 when the device 10 is in use. Preferably, the socket extension 80 is inserted through the aperture 130 and into the receiving section 60. The securing socket 110 may then be inserted into the adjusting socket 70 and contacted with the socket coupling device 120 to produce releasable attachment thereto. Preferably, the outer diameter of the securing socket 110 and the outer diameter of the drive connector 100 are greater than the diameter of the aperture 130, so that removal of the second component 30 from the first component 20 is prohibited once the second component is assembled. Once the device 10 is properly configured, the second component 30 is attached to the torque exerting device of choice. The first component is then placed in contact with the double-nut arrangement 160 such that the adjusting socket 70 engages the inner nut 170 thereof, and the second component 30 is then placed in contact with the double-nut arrangement such that the securing socket 110 engages the inner nut 180 thereof.

In the embodiment of the device 10 described herein, removal of the securing socket 110 from the socket coupling device 120 of the socket extension 80 is facilitated by the provision of a socket removal aperture 140 that passes through the receiving section 60. The socket removal aperture 140 allows contact with the securing socket 110 while it is residing within the receiving section 60. As can be seen in FIGS. 1–4, a spring-loaded pin 150 may also be used to help retain the securing socket 110 on the socket extension 80. The socket removal aperture 140 is preferably positioned on the receiving section 60 such that it can be aligned with the spring-loaded pin 150. A small tool or other device may be inserted through the socket removal aperture 140 to dislodge the securing socket 110 from the socket coupling device 120, either by acting on the securing socket itself, or by depressing the spring-loaded pin 150. In addition to its use for the changing of the securing socket 110, the ability to disconnect the securing socket from the socket extension 90 in this manner may also be useful if, for example, the securing socket becomes stuck on the outer nut 180 during use of the device 10. Once the securing socket 110 is detached from the socket coupling device 120, the socket extension 80 and the securing socket may be removed from the first component 20.

With reference especially to FIG. 6, it can be observed that when the second component 30 is properly assembled to the first component 20, the securing socket 110 is able to pass along the interior of the receiving section 60 and enter the interior space of the adjusting socket 70, but is prohibited from withdrawal through the aperture 130. In this manner, the adjusting socket 70 may be engaged with the larger diameter, inner nut 170, and the securing socket may be caused to engage the smaller diameter, outer nut 180 of the fastener assembly 190. The device 10 thereby allows for the independent rotation of each of the inner and outer nuts 170, 180 from the nut-side of the fastener assembly 190, permitting both an adjustment to the rotational position thereof via the inner nut, and a tightening of the fastener assembly via the outer nut.

With the outer diameter of both the securing socket 110 and the drive connector 100 being larger than that of the aperture 130 in the handle portion 40 of the first component 20, a portion of the second component 30 may continually reside within the first component and the device 10 may be moved and used as a single unit. Alternatively, however, the device 10 may also be designed so that the diameter of the aperture 130 is large enough to permit the securing socket 110 to pass therethrough. In this case, the second component 30, including the securing socket portion 110 thereof, may be inserted into the first component 20 through the aperture 130—either after the first component is already engaged with the inner nut 170, or before the first component is placed in contact with the inner nut. In this embodiment, the securing socket 110 may be permanently affixed to the body 90 of the socket extension 80.

An exemplary fastener assembly 190 for use as described above may be viewed in FIG. 6. The fastener assembly 190 has a cylindrical fastener body 200, much like a typical bolt—with a head 210 on one end and a threaded segment (not shown) on the other end. A disk-shaped integral flange 220 may be provided at the intersection of the head 210 and the fastener body 200, such that the fastener body passes through the flange at a point off-center from the longitudinal axis thereof. Flat areas (not shown) are provided on the fastener body 200 for engaging an interior feature of the inner nut 170. The inner nut 170 is typically not threaded, but may cause rotation of the fastener body 200 by contacting the flat areas located thereon. The inner nut 170 also preferably has a flange 230, that substantially corresponds to the size of the integral flange 220 of the fastener body 200, as well as to its orientation with respect thereto when the inner nut is properly engaged with the fastener body.

With the inner nut 170 placed on the fastener body 200, the first component 20 may be used to adjust the rotational position of the fastener assembly 190. A guide 250 (see FIG. 7) may be provided on the structure 260 (see FIG. 7) in which the fastener assembly 190 is installed, such that rotation against the guide by one, or both, of the flanges 220, 230 during rotation of the fastener body 200, can produce a displacement of at least a portion of the structure. Once the proper displacement of the structure 260 is achieved through rotation of the fastener body 200 by the first component 20 acting on the inner nut 170, the second component 30 can be used to tighten the outer nut 180, thereby securing both the fastener assembly 190 and the structure in the desired position. The device 10 of the present invention not only allows for an adjustment of the position of the fastener assembly 190 and structure 260 to be accomplished, it also permits both the adjustment operation and the securing (tightening) operation to be performed from the double-nut side of the fastener assembly.

The particular application of employing such a fastener assembly 190 and the device 10 of the present invention to set the toe angle of an automobile wheel is illustrated in FIGS. 7A and 7B. The fastener assembly 190 can be observed to pass through a bracket attached to the vehicle suspension and to a structure for mounting the vehicle's wheel. A guide 250 is provided on the bracket, such that when the fastener assembly is rotated by the device 10 of the present invention, one, or both of the flanges 220, 230 will contact the guide and cause a displacement of the wheel with respect to the longitudinal axis of the vehicle. Consequently, the fastener assembly 190 and the device 10 of the present invention can be utilized to set the automobile's wheel toe angle.

While only one exemplary embodiment of a double-nut fastener assembly has been shown and described above, it should be realized by one skilled in the art that the device of the present invention could be used on virtually any double-nut arrangement wherein the inner nut is of a larger diameter than the outer nut.

Therefore, while certain embodiments of the present invention are described in detail above, the scope of the invention is not to be considered limited by such disclosure, and modifications are possible without departing from the spirit of the invention as evidenced by the following claims:

1. A method of operating on a single side of a rotatable fastener assembly to produce and secure a change of displacement of a structure associated therewith, said method comprising:

providing a fastener assembly having a fastener body with a double-nut arrangement near one end and a head attached to the other end, wherein both an inner nut of said double-nut arrangement and said head possess an eccentric flange, said inner nut adapted so that rotation thereof causes a corresponding rotation of said fastener body;

inserting said fastener assembly into a first structure that is displaceably connected to a second structure, such that said double-nut arrangement resides on one side of said first structure and said head resides on an opposite side of said first structure;

providing at least one protrusion on said second structure for contacting at least one of said eccentric flanges when said fastener assembly is rotated;

providing a device for operating on said double-nut arrangement, said device having a first component with an adjusting socket at a first end for releasably engaging said inner nut, and a handle at a second end for manipulating said first component, said handle further having an aperture for receiving at least a portion of a second component into said first component;

assembling a second component to said first component so that at least a portion of a securing socket located at a first end of said second component resides within said first component, a second end of said second component protruding through said aperture in said handle;

attaching said second end of said second component to a torque exerting device;

engaging said adjusting socket of said first component with said inner nut;

using said first component to rotate said inner nut and said fastener body, and to maintain the rotated position thereof while at least a portion of said second component resides within said first component;

engaging said securing socket with an outer nut of said double-nut arrangement; and using said torque exerting device and said second component to secure said rotated position of said inner nut and said fastener body by tightening said outer nut while at least a portion of said second component resides within said first component;

whereby at least one of said eccentric flanges acts on said at least one protrusion during rotation of said inner nut, thereby causing a change of displacement of said first structure with respect to said second structure that is substantially perpendicular to the longitudinal axis of said fastener body.

2. The method of claim 1, wherein said socket of said second component is attached to said second component after a portion of said second component has been inserted into said first component via said aperture in said handle.

3. The method of claim 2, wherein the outer diameters of each of said socket and said second end of said second component are of a size that prohibits them from passing through said aperture.

4. The method of claim 1, wherein said socket of said second component is attached to said second component prior to the insertion of said second component into said first component.

5. The method of claim 1, wherein rotation of said inner nut causes a substantially lateral displacement of said fastener assembly.

6. The method of claim 1, wherein rotation of said inner nut causes a substantially vertical displacement of said fastener assembly.

7. A method of adjusting the toe angle of a vehicle wheel from a single side, said method comprising:

providing a fastener assembly having a fastener body and a double-nut arrangement, wherein an inner nut of said arrangement and a head attached to said fastener body possess an eccentric flange;

providing a device for operating on each nut of said double-nut arrangement, said device having a first component adapted to receive at least a portion of a second component, said first component having an adjusting socket at a first end for releasably engaging said inner nut and a handle at an opposite end, said second component having a securing socket at a first end for releasably engaging said outer nut and a coupling device at a second end for coupling said second component to a torque exerting device;

inserting said fastener assembly into a structure connecting said vehicle wheel to the vehicle's suspension;

providing a guide on said structure for contacting at least one of said eccentric flanges when said fastener assembly is rotated;

assembling said second component to said first component so that at least a portion of said securing socket resides within said first component while said second end of said second component protrudes through an aperture in said handle of said first component;

coupling said second end of said second component to a torque exerting device;

engaging said adjusting socket with said inner nut;

using said first component to rotate said inner nut and said fastener body, and to maintain the rotated position thereof while at least a portion of said second component resides within said first component;

engaging said securing socket with said outer nut; and using said torque exerting device and said second component to secure said rotated position of said inner nut and said fastener body by tightening said outer nut while at least a portion of said second component resides within said first component;

whereby at least one of said flanges acts on said guide during rotation of said inner nut, thereby causing a displacement of said structure and an adjustment of said wheel toe angle.

8. The method of claim 7, wherein said wheel is located on the rear of said vehicle.

9. The method of claim 7, wherein said inner nut is adapted to receive a flatted portion of said fastener body, thereby allowing rotation of said inner nut to be translated to said fastener body.

10. The method of claim 7, wherein said torque exerting device attached to said second end of said second component is a ratcheting wrench handle.

11. The method of claim 7, wherein said torque exerting device attached to said second end of said second component is a pneumatic wrench.

12. The method of claim 7, wherein said torque exerting device attached to said second end of said second component is a pneumatic impact gun.

13. The method of claim 7, further comprising providing indicia on one or both of said eccentric flanges to indicate the amount of rotation or displacement that has occurred.

* * * * *